United States Patent [19]

Spilde

[11] Patent Number: 4,666,082
[45] Date of Patent: May 19, 1987

[54] TEMPERATURE RESPONSIVE PNEUMATIC CONTROL DEVICE

[76] Inventor: Rodney Spilde, 6300 W. Richmond Rd., Aberdeen, S. Dak. 57401

[21] Appl. No.: 903,152

[22] Filed: Sep. 3, 1986

[51] Int. Cl.⁴ ............................................. G05D 23/12
[52] U.S. Cl. ..................................... 236/86; 200/83 J; 251/61.2
[58] Field of Search .................. 236/86, 87, 99 R; 251/61.2, 61.4, 63.4; 200/83 J

[56] References Cited

U.S. PATENT DOCUMENTS

| | | | |
|---|---|---|---|
| 1,439,750 | 12/1922 | Nelson | 236/99 R |
| 3,125,111 | 3/1964 | Daly | 236/86 X |
| 3,394,687 | 7/1968 | Scott | 236/86 X |
| 3,689,025 | 9/1972 | Kiser | 251/61.4 X |
| 4,016,804 | 4/1977 | Turecek | 236/99 R X |
| 4,214,698 | 7/1980 | Josefsson | 236/99 R X |
| 4,503,301 | 3/1985 | Kurtz | 200/83 J X |

Primary Examiner—William E. Tapolcai, Jr.
Attorney, Agent, or Firm—Malcolm Reid

[57] ABSTRACT

A temperature responsive pneumatic control device comprising a receptacle containing a temperature responsive fluid therein, the receptacle being in open communication with a first diaphragm which in turn is in movable communication in a piston capable of being displaced by movement of the diaphragm, the piston being in communication with a rod attached to a second diaphragm and extending on both sides thereof such that the end of the rod downstream from the diaphragm is in communication with an air supply valve, which upon displacement gives a pneumatic signal to a pneumatic device such as a ridge vent in a building.

7 Claims, 3 Drawing Figures

TEMPERATURE RESPONSIVE PNEUMATIC CONTROL DEVICE

FIELD OF THE INVENTION

This invention relates to a temperature control system, and in particular to a pneumatic control system for controlling pneumatic devices which are operative based on temperature.

BACKGROUND OF THE INVENTION

There are numerous areas where control based on temperature is desired. Many of such devices are manually controllable, such as wall vents, for example. However, manual operation takes a great deal of time and effort, and may be inaccessible, such as, for example, ridge vents that are located a substantial distance from the floor of the area to be controlled.

In addition, the devices to be controlled may be many, as for example, in areas such as greenhouses. Obviously, covers or ventilating units on greenhouses must be opened to avoid temperatures which prevail inside the closed space limited by the frame of the greenhouse from reaching an undue level when sun rays directly strike the glass cover, and similarly the covers must be closed when the temperature decreases below a predetermined value, based upon the setting of the sun or a change in ambient conditions.

There have been disclosed systems for thermostatically controlling such ventilating devices, but such have been based on electric input, or are expensively valved to afford satisfactory operation.

The present invention provides a simple device for the pneumatic control of such ventilating devices as wall ventilators, ventilating curtains, ridge vents, or any other device the control of which is based on temperature of an enclosed space.

DISCLOSURE OF THE INVENTION

In accordance with the invention there is provided a temperature responsive pneumatic control device comprising a receptacle of variable volumetric capacity containing a fluid therein capable of expanding or contracting with temperature, the receptacle having one closed end and one open end, the open end being fixedly attached to one end of a housing. The open end of the receptacle is in open communication with a first diaphragm within the housing, the diaphragm being in movable communication with a piston within the housing, the piston being mounted so as to be displaced by movement of this first diaphragm. The piston is, at its opposite end, in movable communication with a rod which is fixedly attached to one side of a second diaphragm, and extends on both sides thereof. The end of the rod which is downstream from the second diaphragm is in movable communication with a variable air supply valve which is fixedly attached to the other end of the housing. At this same end of the housing, and in open communication with the air valve is an air outlet port, the air flow therethrough being dependent on the operation of the variable air supply valve. In addition, there are provided means to substantially equalize air pressure within the housing, so that there is a minimization of fluctuation in air pressure therein, and especially across the second diaphragm. In this manner, the control device provides smooth and slow transition in dictating the movement to the pneumatic device which the controller is controlling. Once the temperature being sensed is stabilized, constant pressure will be maintained on the pneumatic device.

DESCRIPTION OF THE PREFERRED EMBODIMENTS

Figure 1:
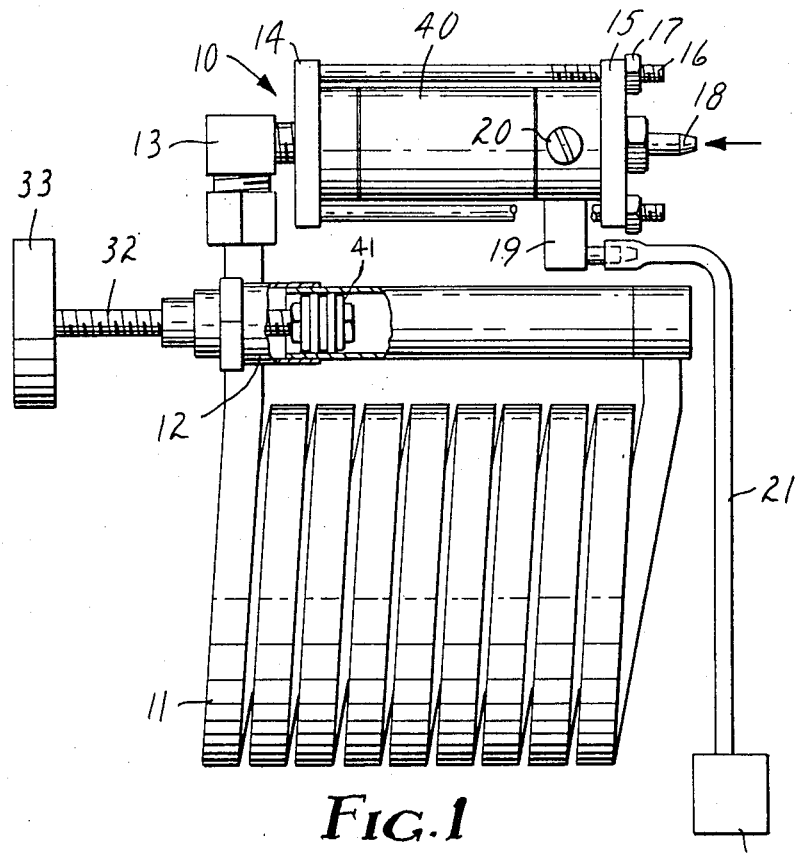
FIG. 1 is a schematic view of a control device constructed in accordance with the invention.

The preferred embodiment of the present invention is depicted in the drawings. Referring now to FIG. 1, there is illustrated a temperature responsive pneumatic control device designated generally by the numeral 10. Control device 10 is comprised of a receptacle 11 of variable volumetric capacity which contains therein a fluid capable of expanding or contracting with temperature, an example thereof being ethylene glycol. A preferred receptacle is illustrated, wherein same is a helical coil. Receptacle 11 has an open end 13 which is fixedly connected to one end of housing 40 of the invention, and a closed end 12 which can be constructed to provide a variable volume within receptacle 11. As illustrated, there is a manually operated valve comprising stem 32 and knob 33 which can be utilized to increase or reduce the volume of receptacle 11 to determine the temperature differential within which the control device will operate. By adjusting this valve, a reference point can be determined from which expansion and contraction of the fluid within the receptacle will afford operation of the control device.

Figure 2:
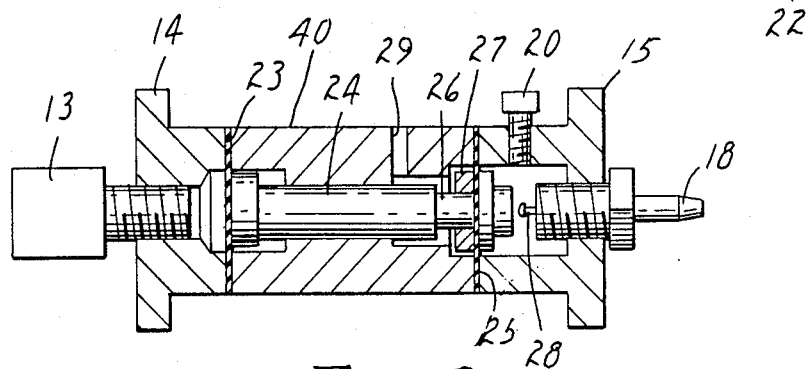
FIG. 2 is a broken-away top view of the internal portions of the housing of the control device.

As discussed above, open end 13 of receptacle 11 is fixedly attached to housing 40, and is in open communication with a first flexible diaphragm 23 (See FIG. 2). Diaphragm 23 is in movable communication with piston 24, with piston 24 being positioned within the housing so as to be able to be displaced by movement of first diaphragm 23. Preferably, piston 24 has a plastic sleeve or a low friction coating around the external surface thereof to minimize the slidable friction of the piston as it is displaced by movement of the first diaphragm. The other end of piston 24 is in movable communication with a rod 26 which is fixedly attached to a second diaphragm 25 by retaining ring 27. Rod 26 extends beyond second diaphragm 25 and is in movable communication with a variable air supply valve 28, through which supply air can enter via supply air port 18. Preferably, variable air supply valve 28 is a simple spring biased valve, much like the stem valves conventionally contained in common automobile tires.

Also at this end of housing 40 of the device of the invention is pneumatic signal outlet port 19, to which is conventionally attached tubing or pipe 21 which is operably connected to a pneumatic device 22 such as a ridge vent, for example.

Figure 3:
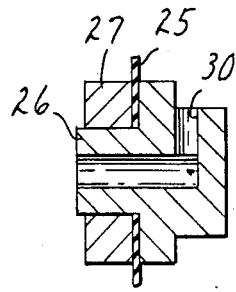
FIG. 3 is a cut-away side view of the second diaphragm contained within the housing of the control device.

FIG. 3 illustrates in more detail second diaphragm 25 discussed above, with first rod 26 fixedly attached thereto, with a portion of rod 26 extending beyond diaphragm 25. Diaphragm 25 is retained in a fixed position on rod 26 by retaining ring 27 which may be pressure fit on rod 26, as illustrated by FIG. 3.

The device also preferably contains a manually operable exhaust valve 20 which will allow air to exhaust therethrough, when the controller is operated, to equalize air pressure within housing 40. In addition, there preferably is also exhaust port 30 in rod 26 to allow air to bleed or exhaust through diaphragm 25 and out of outlet port 29 through housing 40 so that pressure equalization within the housing is maintained, especially across second diaphragm 25.

In operation, temperature adjustment knob 33 is manually operated to find or determine the temperature differential at which control device 10 is to operate. In other words, by adjustment of this valve, a new reference point can be determined from which the expandable fluid contained in the receptacle, such as ethylene glycol, will expand and contract. When the temperature in the environment being measured rises, it causes the fluid in receptacle 11 to expand. This expansion within receptacle 11 flexes diaphragm 23, which in turn causes piston 24 to be slowly extended through housing 40 to make contact with rod 26 attached to second diaphragm 25. This contact by piston 24 causes depression of second diaphragm 25, which, because of contact by rod 26 with variable air inlet valve 28, allows air to enter housing 40 to pressurize pneumatic port 19. The amount of air pressurizing pneumatic port 19 is determined by the degree of opening of variable inlet valve 28, which in turn is determined by the temperature sensing receptacle 11. In this manner, a variable signal is provided to a pneumatic device to open or close, depending on the action desired, and the expansion or contraction of the fluid in receptacle 11.

As illustrated, means are provided to equalize pressure within housing 40 to ensure smooth and slow transition relative to a signal to the pneumatic device being controlled. In the preferred embodiment illustrated, a manually adjustable exhaust valve 20 is illustrated which, upon adjustment, will provide a constant flow of air exhausting through housing 40. If valve 20 cannot exhaust sufficient air to allow for pressure equalization, rod 26 attached to second diaphragm 25 contains exhaust port 30 therein. Excess air will exhaust throught port 30 to an opening 29 in housing 40 to assist manually operable exhaust valve 20 in equalizing pressure in housing 40. In this manner, the movement of second diaphragm 25 will be solely based on the temperature fluctuations sensed by the fluid in receptacle 11 rather than back pressure caused by inlet air entering through valve 28 which could provide a false movement because of the pressure differential across second diaphragm 25.

Preferably, the two ends 14 and 15 of housing 40 are flanged, with mating holes in the flanges to allow external bolts, illustrated as 16 with nuts 17 to hold housing 40 in an integral fashion. In this manner, housing 40 can be made up of separate components containing each of the operable elements of control device 10, without the necessity of expensive machining to provide the interlocking of each element.

The above description of the preferred embodiment is not intended to unduly limit the scope of the invention. All changes and modifications which fall within the spirit of the invention are intended to be included within its scope as defined by the claims.

What is claimed is:

1. A temperature responsive pneumatic control device comprising a receptacle of variable volumetric capacity containing a fluid therein capable of expanding or contracting with temperature, having one closed end and one open end, said open end being fixedly attached to one end of a housing and in open communication with a first diaphragm therein, said first diaphragm being in movable communication with a piston within said housing, said piston being mounted so as to be able to be displaced by movement of said first diaphragm, said piston being in movable communication with a rod fixedly attached to a second diaphragm and extending on both sides thereof, the downstream end of said rod being in movable communication with a variable air supply valve fixedly attached to the other end of said housing, a pneumatic outlet port in said other end of said housing, the air flow therethrough being dependent on the displacement of said variable air supply valve, and means to substantially equalize air pressure in said housing.

2. The device of claim 1 wherein said closed end of said receptacle contains manually adjustable valve means capable of varying the volume within said receptacle.

3. The device of claim 1 wherein said means to substantially equalize air pressure in said housing comprises a manually operable exhaust valve located in said housing between said variable air supply valve and said rod, and an exhaust port in said rod capable of allowing air to exhaust across said second diaphragm and through an exhaust port in said housing adjacent the upstream end of said first rod.

4. The device of claim 1 wherein said piston contains a plastic sleeve therearound to reduce the sliding friction thereof.

5. The device of claim 1 wherein said fluid is ethylene glycol.

6. The device of claim 1 wherein said receptacle is a helical coil.

7. The device of claim 1 wherein said variable air supply valve is a spring biased valve.

* * * * *